(12) United States Patent
Wang (10) Patent No.: US 12,287,928 B2
(45) Date of Patent: Apr. 29, 2025

(54) ROLLER LINKAGE MECHANISM AND COMPUTER PERIPHERAL USING THE SAME

(71) Applicant: Silitek Electronics (Dongguan) Co., Ltd, Dongguan (CN)

(72) Inventor: Jun Wang, Dongguan (CN)

(73) Assignee: SILITEK ELECTRONICS (DONGGUAN) CO., LTD, Dongguan (CN)

( * ) Notice: Subject to any disclaimer, the term of this patent is extended or adjusted under 35 U.S.C. 154(b) by 0 days.

(21) Appl. No.: 18/583,192

(22) Filed: Feb. 21, 2024

(65) Prior Publication Data

US 2024/0385705 A1   Nov. 21, 2024

(30) Foreign Application Priority Data

May 17, 2023   (CN) .......................... 202310562699.X (51) Int. Cl.
G06F 3/0362   (2013.01)

(52) U.S. Cl.
CPC .................................. G06F 3/0362 (2013.01)

(58) Field of Classification Search
CPC ...... G06F 3/0362; G06F 3/0312; G06F 3/033; G06F 3/0354; G06F 3/03541; G06F 3/03543

See application file for complete search history.

(56) References Cited

U.S. PATENT DOCUMENTS

| | | | |
|---|---|---|---|
| 2008/0165128 A1* | 7/2008 | Cheng | G06F 3/03543 345/163 |
| 2013/0321272 A1* | 12/2013 | Deng | G06F 3/0362 345/163 |
| 2014/0145954 A1* | 5/2014 | Wu | G06F 3/03543 345/163 |
| 2018/0275776 A1* | 9/2018 | Li | G06F 3/0362 |

FOREIGN PATENT DOCUMENTS

| | | |
|---|---|---|
| CN | 204229357 U | 3/2015 |
| CN | 112905028 A | 6/2021 |
| CN | 216817363 U | 6/2022 |
| CN | 217305825 U | 8/2022 |

* cited by examiner

*Primary Examiner* — Hong Zhou
(74) *Attorney, Agent, or Firm* — WPAT, PC (57) ABSTRACT

A roller linkage mechanism and a computer peripheral using the same are provided. The roller linkage mechanism includes a bottom casing, a rotatable member, a control circuit, a connecting rod and a linkage button. The bottom casing has a bottom side. The rotatable member is rotatably arranged on the bottom side through a bracket and includes a damping element. The control circuit is disposed on the bottom side. When the rotatable member rotates, the control circuit is triggered to output at least one signal. The connecting rod is rotatably fixed on the bracket and has a contact end and a pivot end. The linkage button is disposed on the bottom side and pivotally connected to the pivot end to drive the connecting rod to rotate, so that the contact end is driven to contact with or separate from the damping element.

13 Claims, 8 Drawing Sheets

ROLLER LINKAGE MECHANISM AND COMPUTER PERIPHERAL USING THE SAME

This application claims the benefit of China Application Serial No. 202310562699.X filed at May 17, 2023, the subject matter of which is incorporated herein by reference.

BACKGROUND OF THE INVENTION

Field of the Invention

The invention relates in general to a computer peripheral, and more particularly to a linkage mechanism of the computer peripheral.

Description of the Related Art

Among various computer peripherals, the mouse is one of the indispensable peripherals of a computer. A typical mouse includes a roller and a press-key, so that the user can hold the mouse to move the cursor on the computer monitor. By pressing the press-key of the mouse, the user can click the image object on the computer monitor or execute a function command. Also, the user can turn the roller with his/her finger to generate a pulse signal, with which the computer can determine the direction and speed of the rotation of the roller, control the computer interface and vertically scroll screen pages, zoom pictures or adjust volume.

Current mouse normally has a damping device (such as, braking device or friction device) arranged on the roller to provide a braking function (also called as a normal mode) as the roller rotates, so as to allow the user to feel the damping vibration of the retarded rotation, and achieve a stable control for scrolling the screen page up and down.

As the use of mouse is getting more and more popular, the user's somatosensory requirements of mouse are also getting higher and higher (particularly the somatosensory requirement when the roller rotates) when browsing multimedia pages, searching web pages, operating manufacturing and testing equipment, and playing games. Currently, the industries have provided a mouse which allows the roller smoothly rotate without rotation damping vibration, so that the screen pages can be scrolled swiftly and the requirements of fast browsing of a large volume of webpages can be met.

However, in ordinary operation, most users still hope to sense the damping vibration of the roller. Therefore, it has become a prominent task to provide a mouse with two operation modes and allow the user to swiftly switch between a shuttle mode or normal mode. Thus, the present invention provides an advanced linkage mechanism and a computer peripheral using the same for resolving the problems encountered in the prior art.

SUMMARY OF THE INVENTION

The present invention provides a roller linkage mechanism and a computer peripheral using the same to resolve the abovementioned problems.

According to an embodiment of the present invention, a linkage mechanism is provided. The linkage mechanism includes a bottom casing, a rotatable member, a control circuit, a connecting rod and a linkage button. The bottom casing has a bottom side. The rotatable member is rotatably arranged on the bottom side through a bracket and includes a damping element. The control circuit is disposed on the bottom side. When the rotatable member rotates, the control circuit is triggered to output at least one signal. The connecting rod is rotatably fixed on the bracket and has a contact end and a pivot end. The linkage button is disposed on the bottom side and pivotally connected to the pivot end to drive the connecting rod to rotate, so that the contact end is driven to contact with or separate from the damping element.

According to another embodiment of the present invention, a computer peripheral is provided. The computer peripheral includes the linkage mechanism and an upper cover, wherein the upper cover is coupled with the bottom casing and has a lower surface faces the bottom side, so that the upper cover and the bottom casing together define an accommodation space for at least partially receiving the connecting rod, the bracket, the rotatable member, the control circuit and the linkage button.

According to the above disclosure, the present invention provides a linkage mechanism and a computer peripheral using the same. The linkage mechanism at least includes a rotatable member having a damping element, a connecting rod and a linkage button. The rotatable member is rotatably arranged on the bottom casing through a bracket. The connecting rod is rotatably fixed on the bracket. One end of the connecting rod is pivotally connected to the linkage button, and the other end includes a contact end. By pressing or releasing the linkage button, the user can drive the connecting rod to rotate, so that the contact end is driven to contact with or separate from the damping element or is driven to contact with or separate from the damping element.

When the contact end contacts the damping element, the rotation of the rotatable member can be retarded by the friction, engagement or collision between the contact end and the damping element, so that a rotation damping vibration of the rotatable member can be generated. When the contact end separates from the damping element, the rotatable member can rotate fast in the absence of damping. Through the linkage mechanism, the user can swiftly switch between a shuttle mode and a normal mode with rotation damping vibration.

The above and other aspects of the invention will become better understood with regard to the following detailed description of the preferred but non-limiting embodiment(s). The following description is made with reference to the accompanying drawings.

DETAILED DESCRIPTION OF THE INVENTION

The present invention discloses a linkage mechanism and a computer peripheral using the same, which allow the user to smoothly switch between a shuttle mode and a normal mode. For the object, technical features and advantages of the present invention to be more easily understood by anyone ordinary skilled in the technology field, a number of exemplary embodiments are disclosed below with detailed descriptions and accompanying drawings.

It should be noted that these embodiments are for exemplary and explanatory purposes only, not for limiting the scope of protection of the invention. The invention can be implemented by using other features, elements, methods and parameters. The preferred embodiments are merely for illustrating the technical features of the invention, not for limiting the scope of protection. Anyone skilled in the technology field of the invention will be able to make suitable modifications or changes based on the specification disclosed below without breaching the spirit of the invention. Designations common to the accompanying drawings are used to indicate identical or similar elements.

Figure 1A:
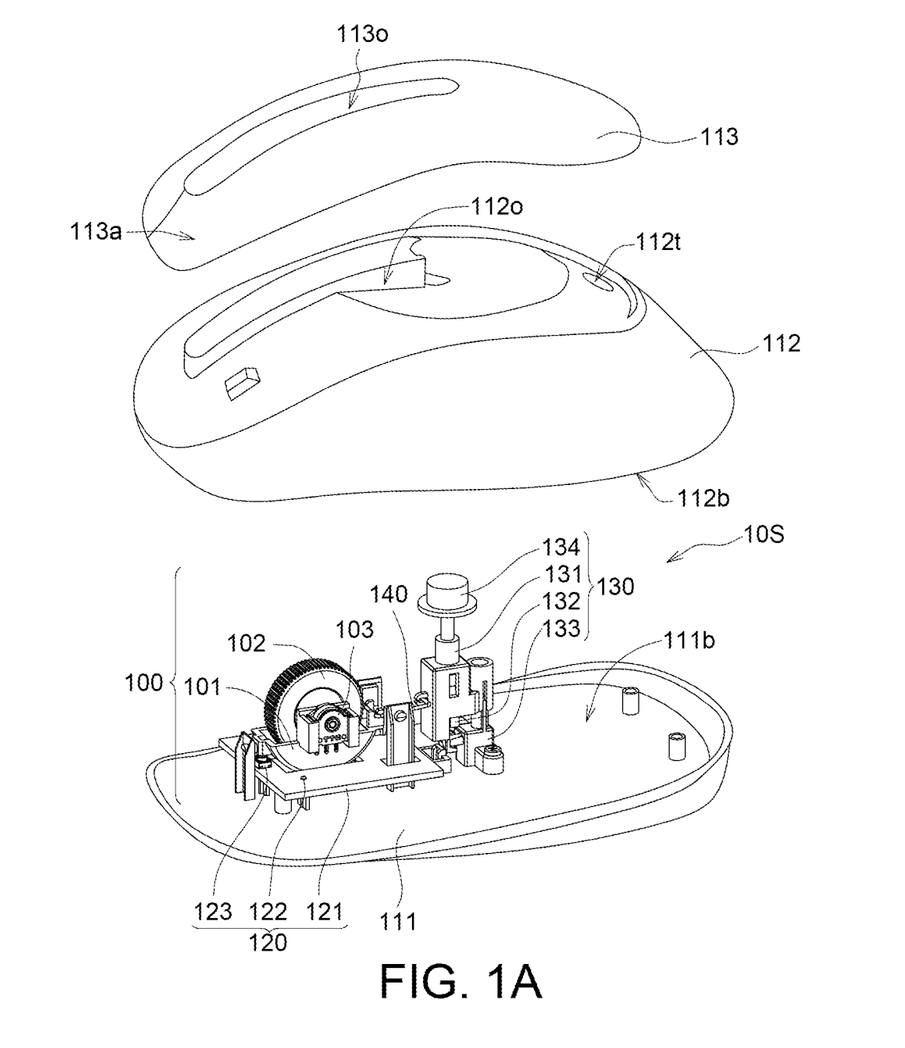
FIG. 1A is a cross-sectional view of partial explosion diagram of a mouse structure according to an embodiment of the present invention.
Figure 1B:
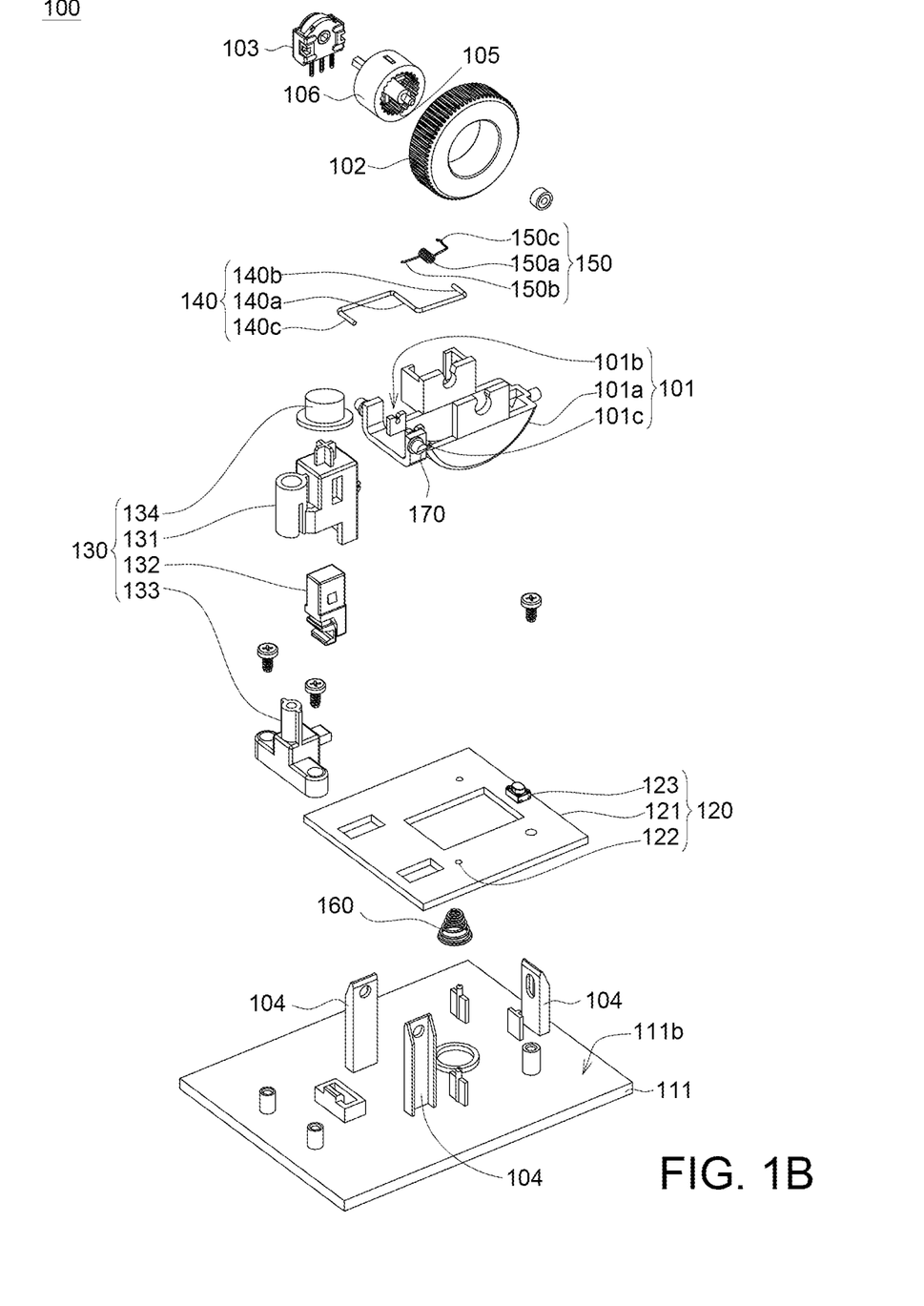
FIG. 1B is a cross-sectional view of an explosion diagram of a roller linkage mechanism of the mouse structure of FIG. 1A.
Figure 1C:
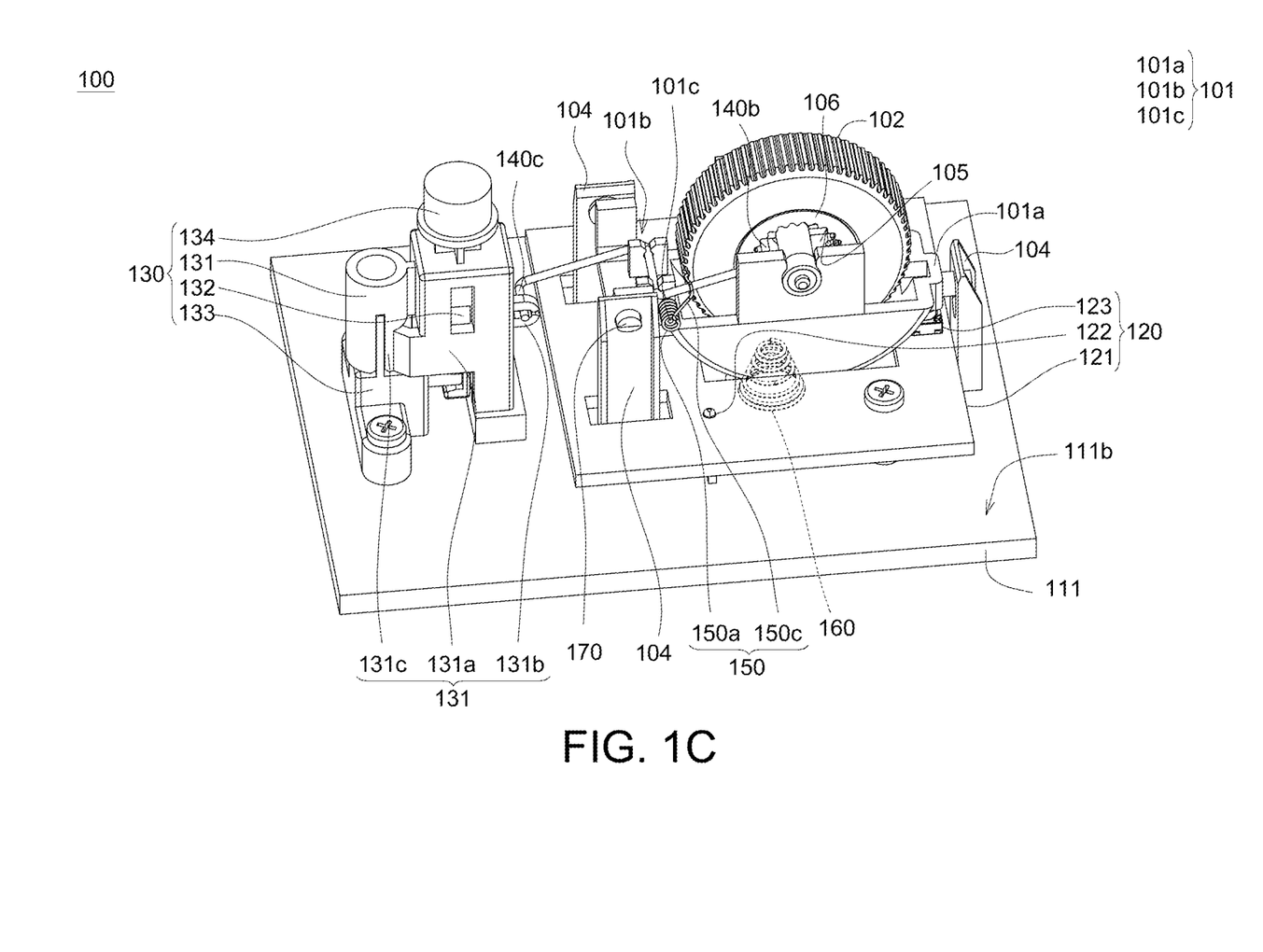
FIG. 1C is an assembly diagram of a roller linkage mechanism of the mouse structure of FIG. 1B.

Refer to FIG. 1A to FIG. 1C. FIG. 1A is a cross-sectional view of partial explosion diagram of a mouse structure 10 according to an embodiment of the present invention. FIG. 1B is a cross-sectional view of an explosion diagram of a roller linkage mechanism 100 of the mouse structure 10 of FIG. 1A. FIG. 1C is an assembly diagram of a roller linkage mechanism 100 of the mouse structure 10 of FIG. 1B. The mouse structure 10 includes a bottom casing 111, an upper cover 112, a key cover 113 and a roller linkage mechanism 100.

The bottom casing 111 has a bottom side 111b. The upper cover 112 is coupled with the bottom casing 111 with the lower surface 112b facing the bottom side 111b of the bottom casing 111, so that the upper cover 112 and the bottom casing 111 together define an accommodation space 10S for at least partially receiving the roller linkage mechanism 100.

In the present embodiment, the roller linkage mechanism 100 includes a roller bracket 101, a roller 102, an encoder 103, a control circuit 120, a connecting rod 140, an elastic member 150 and a linkage button 130. The upper cover 112 and the bottom casing 111, which can respectively be realized by a semi-casing structure, are engaged with each other to define an accommodation space 10S for receiving the roller bracket 101, the roller 102, the encoder 103, the control circuit 120, the connecting rod 140, the elastic member 150 and the linkage button 130 of the roller linkage mechanism 100.

The key cover 113 is located above the top surface 112t of the upper cover 112. In some embodiments of the present invention, the key cover 113 can be realized by a semi-casing or curved plate covering the top surface 112t of the upper cover 112. In the present embodiment, the key cover 113 includes at least one press-key 113a corresponding to at least one press-key switch 122 disposed on the control circuit 120. When the user presses the press-key 113a, the press-key switch 122 will be triggered to output at least one signal for the user to click the image/cursor on the computer monitor (not illustrated) or execute a function command (but is not limited thereto).

Besides, the upper cover 112 further has a through hole 1120 passing through the lower surface 112b and the top surface 112t. The key cover 113 also has a through opening 1130, which corresponds to the through hole 1120 and allows at least one part of the roller 102 and at least one part of the linkage button 130 to be exposed from the through hole 1120 and the through opening 1130, so that the user can rotate the roller 102 or press the linkage button 130.

The control circuit 120 is disposed inside the accommodation space 10S defined by the upper cover 112 and the bottom casing 111 and is fixed above the bottom side 111b of the bottom casing 111 through a bracket 104 and/or a locking element (such as screw or hook (not illustrated)). The control circuit 120 is formed of a circuit board 121 and several active elements and/or passive elements (not illustrated) located on the circuit board 121 and is electrically connected to a host (not illustrated) through wires (not illustrated) or wireless transmission.

In the present embodiment, the control circuit 120 at least includes the press-key switch 122 and micro-switch 123 located above the circuit board 121. The press-key switch 122 can output at least one signal in response to the pressing of the press-key 113a. The micro-switch 123 corresponds to the trigger arm 101a of the roller bracket 101. When the user presses the roller 102, the roller bracket 101 moves downward and drives the trigger arm 101a to trigger the press-key switch 122 to output at least one signal for the user to scroll screen pages, zoom pictures, or adjust volume.

The roller bracket 101 can be movably arranged between the positioning bracket 104 disposed on the bottom side 111b of the bottom casing 111 through a buffer (such as a spring) 160 and a pivot piece (such as a pivot bolt) 170. The roller 102, which can be realized by a rotatable member, can be rotatably and pivotally connected to the roller bracket 101 through a shaft 106. When the roller 102 rotates, the encoder 103 electrically connected to the control circuit 120 will sense the rolling direction and/or distance of the roller 102 using an optical method or a mechanic method and accordingly generate a pulse signal, which positions and controls the cursor on the computer monitor (but is not limited thereto).

The roller 102 includes a damping element 105. In the present embodiment, the damping element 105 can be realized by several concave teeth concavely disposed on the inner side of the roller 102. The connecting rod 140 is rotatably fixed on the roller bracket 101 and has one end which is extendable to be close to the damping element 105, so that the connecting rod 140 can selectively contact several concave teeth of the damping element 105. The rotation of the roller 102 can be retarded by friction, so as to generate rotation damping vibration.

In some embodiments of the present invention, the connecting rod 140 drives the connecting rod 140 to rotate by pressing the linkage button 130, so that the connecting rod 140 can selectively contact or separate from the damping element 105. Thus, the roller 102 can switch between a normal mode with rotation damping vibration and a shuttle mode without rotation damping vibration.

Figure 2A:
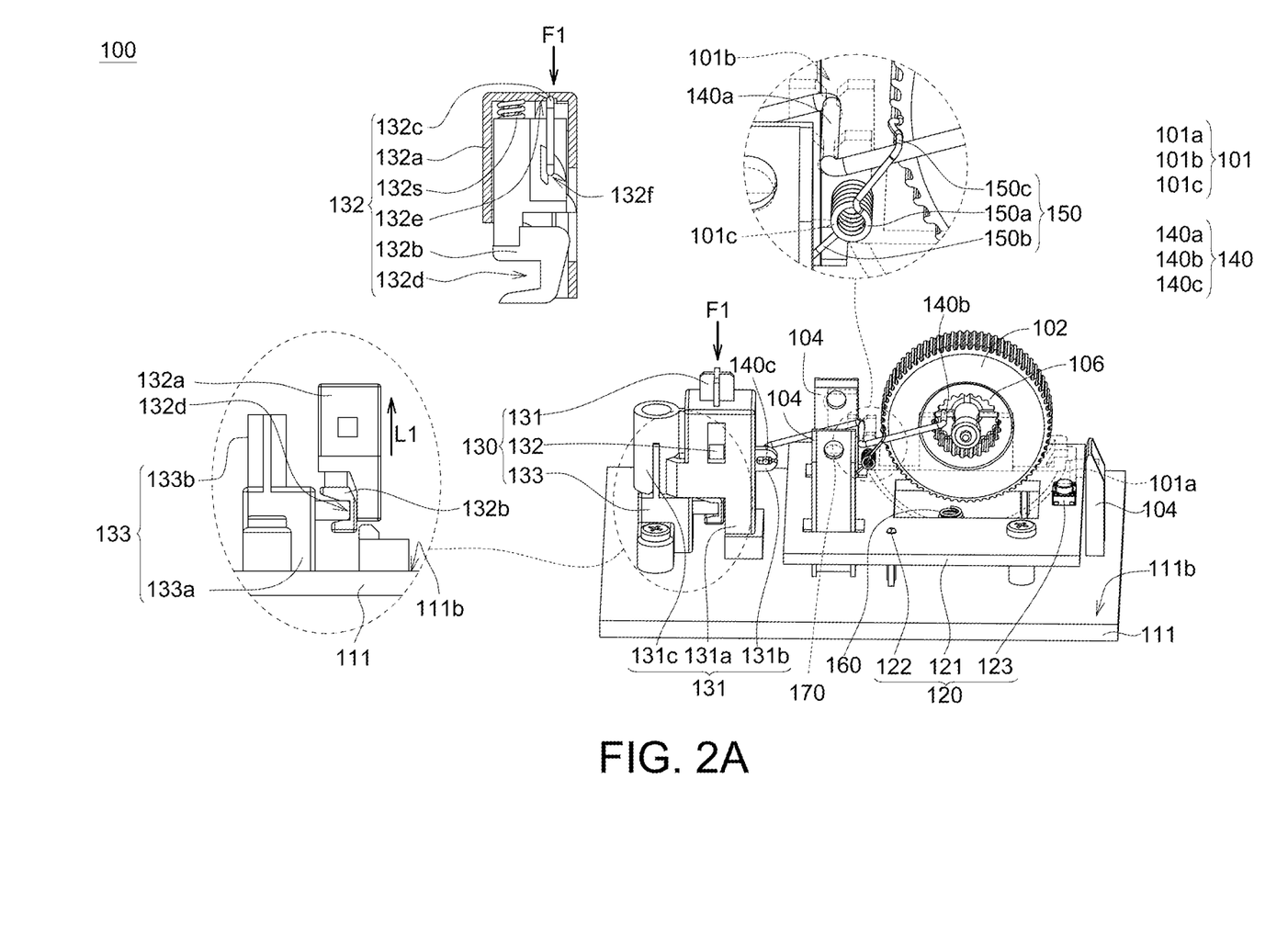
FIG. 2A is a stereoscopic view of the operating structure of a roller linkage mechanism in a shuttle mode according to an embodiment of the present invention.
Figure 2B:
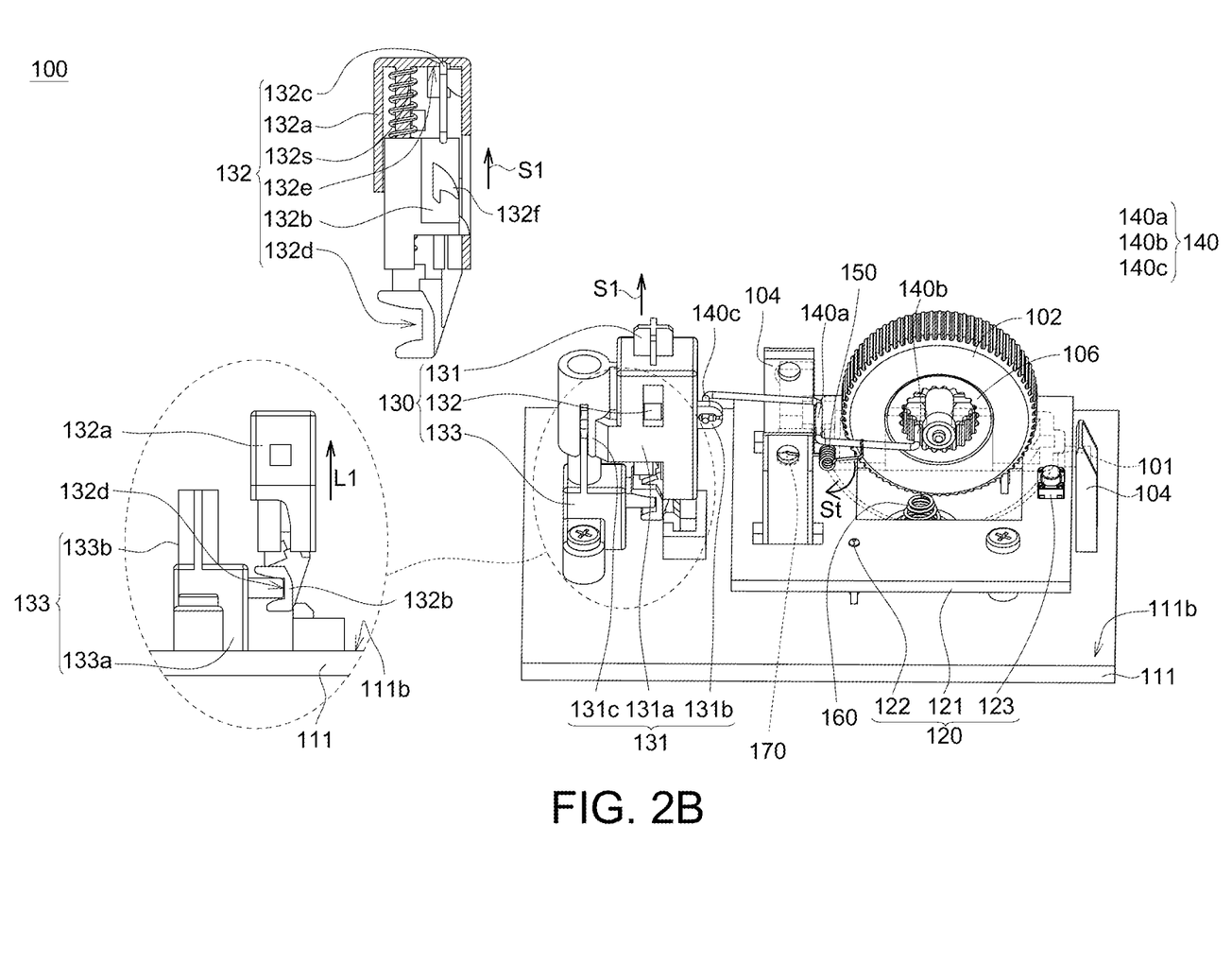
FIG. 2B is a stereoscopic view of the operating structure of the roller linkage mechanism of FIG. 2A in a normal mode.

Refer to FIG. 2A and FIG. 2B. FIG. 2A illustrates the linking relationship between the linkage button 130, the connecting rod 140, the roller 102 and the damping element 105 of the roller linkage mechanism 100 in a shuttle mode according to an embodiment of the present invention. FIG. 2B illustrates the linking relationship between the linkage button 130, the connecting rod 140, the roller 102 and the damping element 105 of the roller linkage mechanism 100 of FIG. 2A in a normal mode.

As indicated in FIG. 2A, the connecting rod 140 includes a hard pivot 140a, a contact end 140b and a pivot end 140c. The contact end 140b and the pivot end 140c respectively are extended outward from two ends of the pivot 140a. The pivot 140a, the contact end 140b and the pivot end 140c are roughly arranged in the shape of S. The pivot rod 140a can be rotatably fixed in the positioning slot 101b disposed on the roller bracket 101. When the pivot 140a rotates with respect to the roller bracket 101, the contact end 140b and the pivot end 140c of the connecting rod 140 will move in opposite directions (such as upward or downward). The linkage button 130 is disposed above the bottom side 111b of the bottom casing 111 and is pivotally connected to the pivot end 140c of the connecting rod 140 to drive the connecting rod 140 to rotate and drive the contact end 140c of the connecting rod 140 to move upward, so that the contact end 140c separates from the damping element 105.

To put it in greater details, the linkage button 130 includes a keycap 134, a fixing member 133, a reciprocating member 131 and a retractable member 132. The keycap 134 is located above the reciprocating member 131. The fixing member 133 includes a base bottom 133a and a guide portion 133b. The base bottom 133a is fixed on the bottom side 111b of the bottom casing 111. The guide portion 133b extends upward from the base bottom 133a along a direction L1 substantially perpendicular to the bottom side 111b of the bottom casing 111.

The reciprocating member 131 is movably connected to the guide portion 133b of the fixing member 133, so as to reciprocate along the extension direction L1. In the present embodiment, the reciprocating member 131 includes a body portion 131a, a pivot slot 131b and a sleeve 131c. The guide portion 133b of the fixing member 133 can be realized by a sliding rod. The body portion 131a of the reciprocating member 131 is mounted on the outside of the retractable member 132. The pivot slot 131b of the reciprocating member 131 is located on one side of the body portion 131a for pivotally connecting the pivot end 140c of the connecting rod 140. The sleeve 131c of the reciprocating member 131 is protruded from the other side of the body portion 131a and allows the guide portion 133b (sliding rod) of the fixing member 133 to pass through.

The retractable member 132 has one end connected to the fixing member 133 and the other end leaning on the reciprocating member 131. To put it in greater details the retractable member 132 includes an inner column 132b, an outer sleeve 132a, a linear spring 132s and a limiting ring 132c. One end of the inner column 132b (lower end) has a fixing hook 132d engaged on the base bottom 133a of the fixing member 133. The outer sleeve 132a is mounted on the other end (lower end) of the inner column 132. The linear spring 132s is located inside the outer sleeve 132a and is interposed abut against between the inner column 132b and the bottom side 132e of the outer sleeve 132a. In the present embodiment, the linear spring 132s is disposed in the outer sleeve 132a in a direction parallel to the extension direction L1, wherein one end of the linear spring 132s leans on the inner bottom side 132e of the outer sleeve 132a, and the other end leans on the top of the inner column 132b. The limiting ring 132c is fixed on the inner bottom side 132e of the outer sleeve 132a.

When the user applies a pressing force F1 to the keycap 134 (not illustrated in FIG. 2A) for moving the reciprocating member 131 downwards along the direction L1 substantially perpendicular to the bottom side 111b of the bottom casing 111, the outer sleeve 132a of the retractable member 132 will be driven by the reciprocating member 131 to move towards the bottom side 111b of the bottom casing 111 with respect to the inner column 132b; meanwhile, the linear spring 132s inside the retractable member 132 is compressed, so that the retractable member 132 is vertically contracted. The limiting ring 132c of the retractable member 132 is engaged with the hook 132f concavely disposed on the surface of the inner column 132b for maintaining the retractable member 132 in a contraction state.

Meanwhile, the pivot slot 131b of the reciprocating member 131 will pull the pivot end 140c of the connecting rod 140 to move downward and drive the pivot 140a of the connecting rod 140 to rotate, so that the contact end 140b of the connecting rod 140 moves upward, and the contact end 140b separates from the damping element 105. Since the contact end 140b of the connecting rod 140 does not contact the damping element 105 and delay the rotation of the roller 102, the roller 102 can rotate fast in the absence of damping. Thus, when the user turns the roller 102, the user does not feel the rotation damping vibration of the roller 102, so that the screen pages can be scrolled swiftly and the requirements of fast browsing of a large volume of webpages can be met.

As indicated in FIG. 2B, after the user apples another force (not illustrated) to the keycap 134 (not illustrated), the limiting ring 132c separates from the hook 132f and the pressing force (not illustrated) is removed, the elastic force S1 stored by the linear spring 132s will restore the linear spring 132s to the original length and further drive the outer sleeve 132a of the retractable member 132 to move upward with respect to the inner column 132b, so that the contracted retractable member 132 will be extended to move the reciprocating member 131 upward along the direction L1.

Meanwhile, the pivot slot 131b of the reciprocating member 131 will pull the pivot end 140c of the connecting rod 140 upward and drive the pivot 140a of the connecting rod 140 to rotate and drive the contact end 140b of the connecting rod 140 to move downward, so that the contact end 140b contacts the damping element 105.

In the present embodiment, the contact end 140b of the connecting rod 140 can be realized by the counter rod of several concave teeth extended into the damping element 105. By contacting, obstructing or colliding the damping element 105, the contact end 140b of the connecting rod 140 can delay the rotation of the roller 10, so that the user can be provided with rotation damping vibration of the roller 102 when turning the roller 102, the rotation of the roller 102 can be provided with an engaging function (referred as a normal mode), and the scrolling distance of the screen page can be stably controlled.

Besides, the elastic member 150 disposed in the roller linkage mechanism 100 enables the contact end 140b of the connecting rod 140 to have continuous contact with the damping element 105, so that the user can feel continuous rotation damping vibration when turning the roller 102. In some embodiments of the present invention, one end of the elastic member 150 is disposed above the bottom side 111b of the bottom casing 111 and the other end contacts the connecting rod 140, so that an elastic force St whose direction is identical to the rotation direction of the connecting rod can be applied to the connecting rod 140 to assure that the contact end 140b has continuous contact with the damping element 105 and continuous rotation damping vibration can be generated.

In the present embodiment, the elastic member 150 can be realized by a torsion spring, having a spiral portion 150a, a first end portion 150b and a second end portion 150c, wherein the first end portion 150b and the second end portion 150c are connected to the spiral portion 150a. The spiral portion 150a is pivotally mounted on a protruding column 101c of the roller bracket 101, and the first end portion 150b leans on the roller bracket 101. The second end portion 150c leans on the part of the connecting rod 140 close to the contact end 140b.

The elastic force (torque) St generated by the elastic member 150 can rotate along with the pivot 140a and move the contact end 140b of the connecting rod 140 downward to lean on the concave teeth of the damping element 105. When the roller 102 rotates, the contact end 140b and the damping element 105 may be separated due to the reaction force of mutual friction, engagement or collision (not illustrated). The elastic force St can offset the reaction force of mutual friction, engagement or collision to assure that the contact end 140b has continuous contact with the damping element 105 and continuous rotation damping vibration can be generated.

Figure 3A:
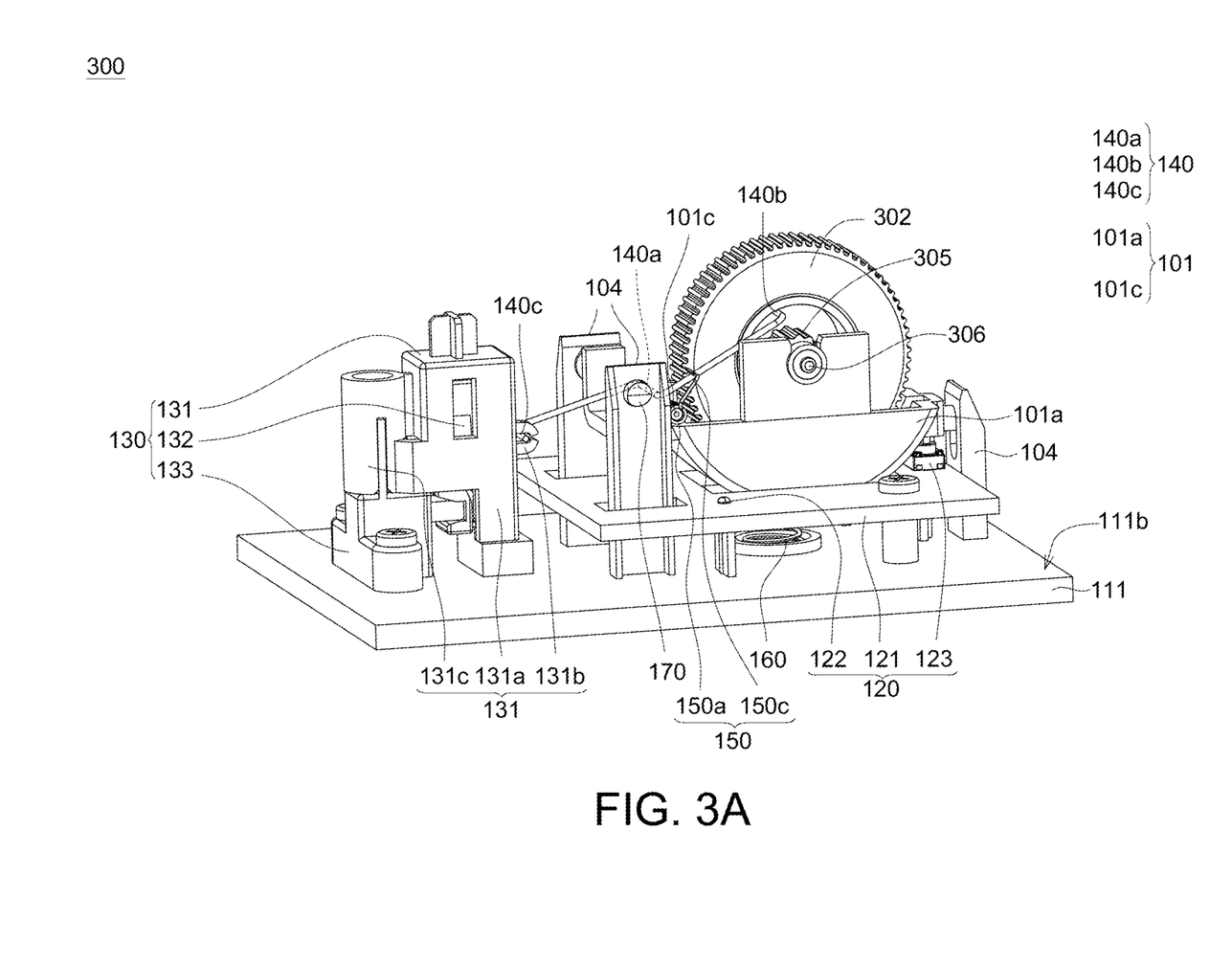
FIG. 3A is a stereoscopic view of the operating structure of a roller linkage mechanism in a shuttle mode according to another embodiment of the present invention.
Figure 3B:
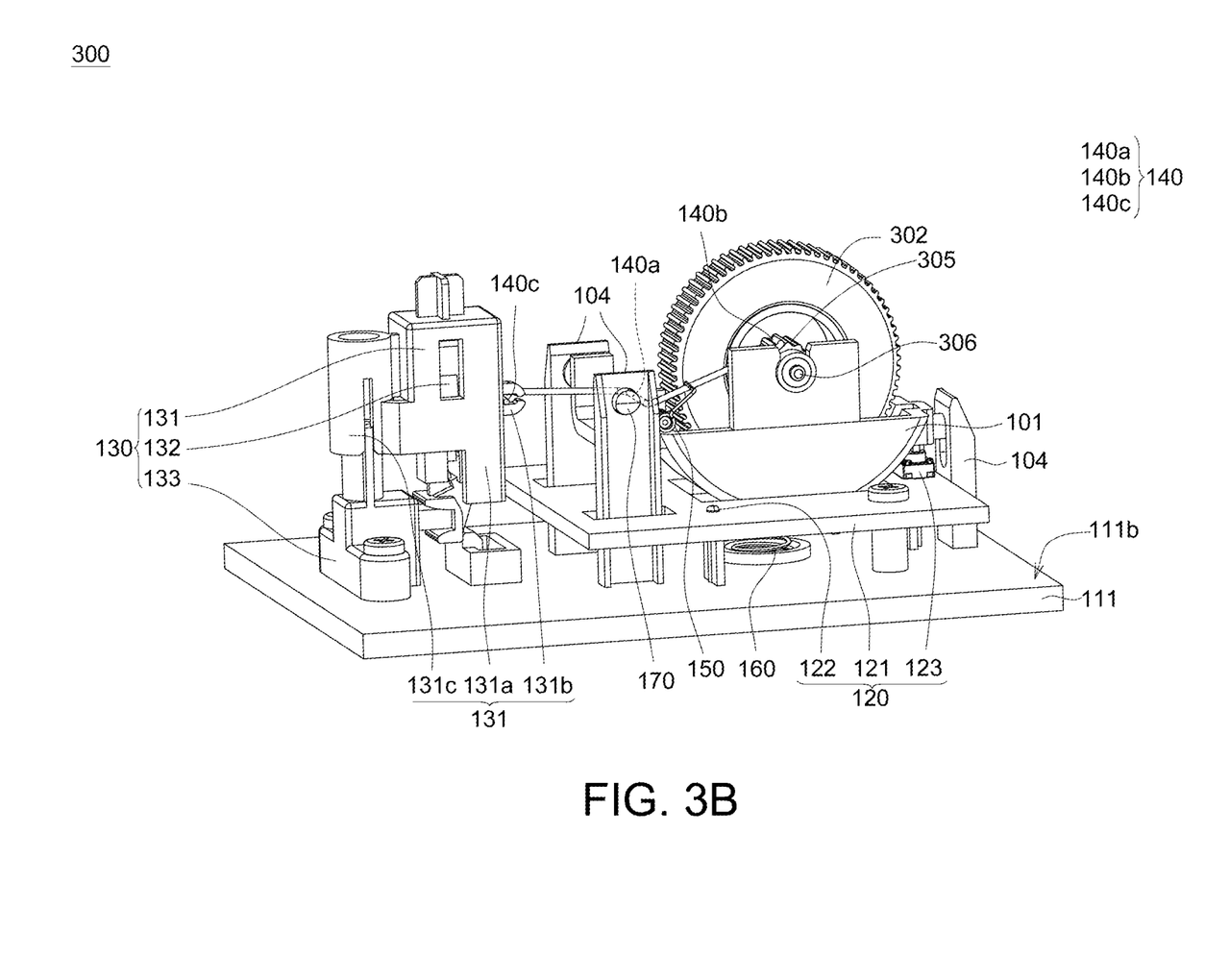
FIG. 3B is a stereoscopic view of the operating structure of the roller linkage mechanism of FIG. 3A in a normal mode.

Refer to FIG. 3A and FIG. 3B. FIG. 3A illustrates the relationship between the linkage button 130, the connecting rod 140, the roller 302 and the damping element 305 of a roller linkage mechanism 300 in a shuttle mode according to another embodiment of the present invention. FIG. 3B illustrates the relationship between the linkage button 130, the connecting rod 140, the roller 302 and the damping element 305 of the roller linkage mechanism 300 of FIG. 3B in a normal mode. The structure of the roller linkage mechanism 300 is similar to that of the roller linkage mechanism 100 of FIG. 2A and FIG. 2B and the two roller linkage mechanisms are merely different in the disposition positions of the roller 302, the shaft 306 and the damping element 305 of the roller linkage mechanism 300. Details of the structure of other elements are disclosed above and are not repeated here.

In the present embodiment, the damping element 305 can be realized by a gear fixed on the shaft 306. In a normal mode (as indicated in FIG. 3B), the contact end 140b of the connecting rod 140 (counter rod) can lean on several convex teeth of the damping element 305 (gear). The rotation of the roller 302 is retarded by the friction, engagement or collision between the counter rod of the contact end 140b and several convex teeth of the damping element 305 (gear), so as to generate rotation damping vibration of the roller 302. In a shuttle mode (as indicated in FIG. 3A), the contact end 140b (counter rod) of the connecting rod 140 is separated from the damping element 305 (gear), so that the roller 302 can rotate fast in the absence of damping. When the user turns the roller 102, the user will not feel the rotation damping vibration of the roller 102.

Figure 4:
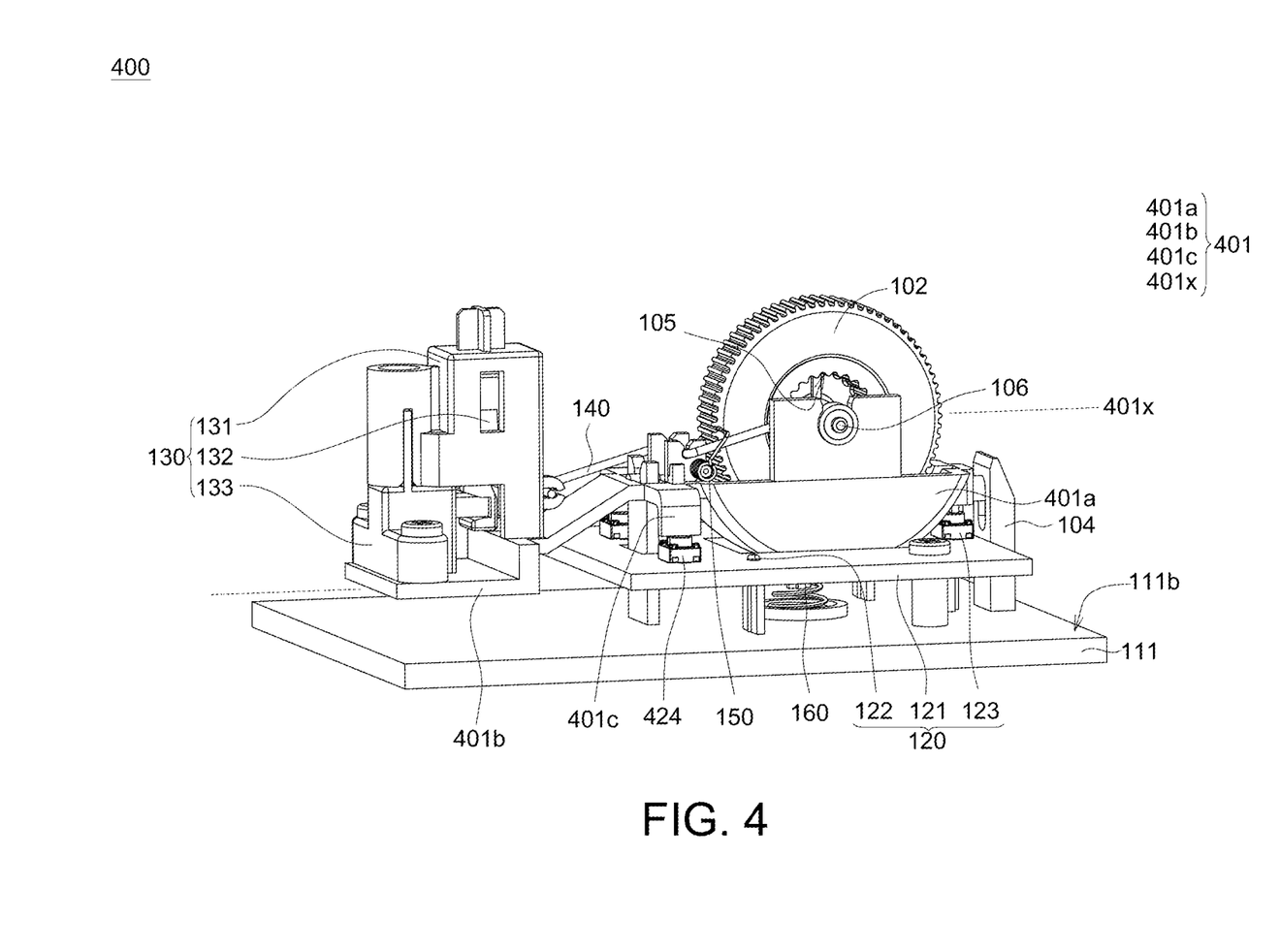
FIG. 4 is a stereoscopic view of a roller linkage mechanism according to an alternate embodiment of the present invention.

Referring to FIG. 4, a stereoscopic view of a roller linkage mechanism 400 according to an alternate embodiment of the present invention is shown. The structure of the roller linkage mechanism 400 is similar to the structure of the roller linkage mechanism 100 of FIG. 2A and FIG. 2B and the two roller linkage mechanisms are merely different in the disposition positions of the roller bracket 401 and the linkage button 130. Details of the structure of other elements are disclosed above and are not repeated here.

In the present embodiment, the roller bracket 401 includes a swing base 401a and at least one trigger arm 401c. The swing base 401a has a swing axis 401x parallel to the bottom side 111b of the bottom casing 111. The roller bracket 401, which can laterally swing with respect to the swing axis 401x, is laterally disposed on the bottom side 111b of the bottom casing 111 for carrying the roller 102, the shaft 106 and the damping element 105.

The trigger arm 401c is extended outward from the swing base 401a and corresponds to the micro-switch 424 disposed on the circuit board 121. When the user presses the roller 102 with a lateral force (not illustrated), the swing base 401a is driven to laterally swing with respect to the swing axis 401x and at the same time the trigger arm 401c tilts to touch the micro-switch 424 and trigger the control circuit 120, which then outputs at least one signal to control the moving direction of the curser on the computer monitor (but is not limited thereto).

Unlike the roller linkage mechanism 100 of FIG. 2A and FIG. 2B in which the fixing member 133 of the linkage button 130 and the roller bracket 101 both are fixed on the bottom side 111b of the bottom casing 111, in the present embodiment, the fixing member 133 of the linkage button 130 is fixed on the extended supporting arm 401b of the roller bracket 401. Thus, when the user operates the roller 102 (the roller bracket 401) to tilt and swing, the user still can press the linkage button 130 to switch between the normal mode with rotation damping vibration and the shuttle mode without rotation damping vibration.

According to the above disclosure, the present invention provides a linkage mechanism and a computer peripheral using the same. The linkage mechanism at least includes a rotatable member having a damping element, a connecting rod and a linkage button. The rotatable member is rotatably arranged on the bottom casing through a bracket. The connecting rod is rotatably fixed on the bracket. One end of the connecting rod is pivotally connected to the linkage button, and the other end includes a contact end. By pressing or releasing the linkage button, the user can drive the connecting rod to rotate, so that the contact end is driven to contact with or separate from the damping element or is driven to contact with or separate from the damping element. When the contact end contacts the damping element, the rotation of the rotatable member can be delayed through the friction, engagement or collision between the contact end and the damping element, so that rotation damping vibration of the rotatable member can be generated. When the contact end separates from the damping element, the rotatable member can rotate fast in the absence of damping. Through the linkage mechanism, the user can swiftly switch between a shuttle mode and a normal mode with rotation damping vibration.

The above disclosure is merely embodiments of the present invention and does not limit the present invention by way of any forms. Although the present invention is disclosed above by way of embodiments, the invention is not limited thereto. Anyone skilled in the technology field of the invention will be able to make suitable modifications or changes based on the above disclosure without breaching the spirit of the invention, and whatever simple corrections, equivalent changes and modifications made to the above embodiments without breaching the spirit of the present invention are still within the scope of protection of the present invention.

What is claimed is:
1. A linkage mechanism, comprising:
   a bottom casing, having a bottom side;
   a rotatable member, rotatably arranged on the bottom side through a bracket and comprising a damping element;
   a control circuit, disposed on the bottom side, wherein when the rotatable member rotates, the control circuit is triggered to output at least one signal;
   a connecting rod, rotatably fixed on the bracket and having a contact end and a pivot end; and a linkage button, disposed on the bottom side and pivotally connected to the pivot end to drive the connecting rod, so that the contact end is driven to contact with or separate from the damping element,
wherein the linkage button comprises:
  a fixing member, comprising a guide portion having an extension direction substantially perpendicular to the bottom side;
  a reciprocating member, movably connected to the guide portion to reciprocate along the extension direction; and
  a retractable member, whose one end is connected to the fixing member and the other end is driven by the reciprocating member to contract or extend,
  wherein the guide portion is a sliding rod, and the reciprocating member comprises:
    a body portion, mounted on the outside of the retractable member;
    a pivot slot, located on one side of the body portion for pivotally connecting the pivot end; and
    a sleeve, protruded from the other side of the body portion, wherein the sleeve allows the sliding rod to pass through.

2. A linkage mechanism, comprising:
a bottom casing, having a bottom side;
a rotatable member, rotatably arranged on the bottom side through a bracket and comprising a damping element;
a control circuit, disposed on the bottom side, wherein when the rotatable member rotates, the control circuit is triggered to output at least one signal;
a connecting rod, rotatably fixed on the bracket and having a contact end and a pivot end; and
a linkage button, disposed on the bottom side and pivotally connected to the pivot end to drive the connecting rod, so that the contact end is driven to contact with or separate from the damping element,
wherein the linkage button comprises:
  a fixing member, comprising a guide portion having an extension direction substantially perpendicular to the bottom side;
  a reciprocating member, movably connected to the guide portion to reciprocate along the extension direction; and
  a retractable member, whose one end is connected to the fixing member and the other end is driven by the reciprocating member to contract or extend,
  wherein the retractable member comprises:
    an inner column, whose one end has a fixing hook for engaging on the fixing member;
    an outer sleeve, mounted on the other end of the inner column; and
    a linear spring, located in the outer sleeve and interposed abut against between the outer sleeve and the inner column.

3. A computer peripheral, comprising:
a linkage mechanism comprising:
  a bottom casing, having a bottom side;
  a rotatable member, rotatably arranged on the bottom side through a bracket and comprising a damping element;
  a control circuit, disposed on the bottom side, wherein when the rotatable member rotates, the control circuit is triggered to output at least one signal;
  a connecting rod, rotatably fixed on the bracket and having a contact end and a pivot end; and
  a linkage button, disposed on the bottom side and pivotally connected to the pivot end to drive the connecting rod, so that the contact end is driven to contact with or separate from the damping element; wherein the linkage button comprises:
    a fixing member, comprising a guide portion having an extension direction substantially perpendicular to the bottom side; and
    a reciprocating member movably connected to the guide portion to reciprocate along the extension direction; the fixing member is fixed on the bracket; and
  an upper cover, wherein the upper cover is coupled with the bottom casing and has a lower surface facing the bottom side, so that the upper cover and the bottom casing together define an accommodation space for at least partially receiving the connecting rod, the bracket, the rotatable member, the control circuit and the linkage button.

4. The computer peripheral according to claim 3, wherein the upper cover has a through hole which passes through the lower surface and allows the reciprocating member and the rotatable member to at least partly pass through.

5. The computer peripheral according to claim 4 further comprising a key cover disposed above the upper cover and at least one press-key corresponding to at least one press-key switch disposed on the control circuit.

6. The computer peripheral according to claim 3, wherein the fixing member and the bracket both are fixed on the bottom side.

7. The computer peripheral according to claim 3, wherein the bracket is a swing base having a swing axis parallel to the bottom side, the swing base is disposed on the bottom side and can laterally swing with respect to the swing axis; and the rotatable member, after receiving a lateral force and laterally swinging with respect to the swing axis, triggers the control circuit.

8. The computer peripheral according to claim 7, wherein the swing base further comprises at least one trigger arm, which extends outwards from the swing base and corresponds to at least one micro-switch of the control circuit; and the rotatable member, after receiving a lateral force and laterally swinging with respect to the swing axis, drives the at least one trigger arm to tilt and press the at least one micro-switch, which then triggers the control circuit to output at least one signal.

9. The computer peripheral according to claim 3, wherein the connecting rod further comprises a pivot rod rotatably fixed on a positioning slot of the bracket, and the two ends of the connecting rod are respectively connected to the pivot end and the contact end.

10. The computer peripheral according to claim 3 further comprising an elastic member whose one end is disposed on the bottom casing, and another end of the elastic member contacts the connecting rod and applies an elastic force to the connecting rod, wherein the direction of the elastic force is inverse to the rotation direction of the connecting rod.

11. The computer peripheral according to claim 10, wherein the elastic member is a torsion spring having a spiral portion, a first end portion and a second end portion connected to the spiral portion; the spiral portion is pivotally mounted on the bracket, the first end portion leans on the bracket; the second end portion leans on the connecting rod to provide the elastic force.

12. The computer peripheral according to claim 3, wherein the rotatable member is rotatably and pivotally connected to the bracket through a shaft, and the damping element is concavely disposed on several concave teeth on the inner side of the rotatable member; the contact end comprises a counter rod extended to the several concave teeth.

13. The computer peripheral according to claim 3, wherein the rotatable member is rotatably and pivotally connected to the bracket through a shaft, and the damping element is fixed on a gear on the shaft; the contact end leans on a counter rod of several convex teeth of the gear.

\* \* \* \* \*